United States Patent [19]
Schweibold et al.

[11] 3,908,365
[45] Sept. 30, 1975

[54] TREATMENT OF GASEOUS EFFLUENT

[75] Inventors: Donald J. Schweibold, Toledo, Ohio; David R. Bentley, Temperance, Mich.

[73] Assignee: Questor Corporation, Toledo, Ohio

[22] Filed: Apr. 13, 1972

[21] Appl. No.: 243,606

[52] U.S. Cl. .............. 60/274; 60/301; 60/306; 423/213.2
[51] Int. Cl.[2] .................... F01N 3/14; F01N 3/16
[58] Field of Search ............ 60/274, 301, 302, 299, 60/292, 289, 290, 306; 23/288 F; 423/212, 213, 213.2, 213.5, 213.7

[56] References Cited
UNITED STATES PATENTS

| 1,902,160 | 3/1933 | Frazer | 60/301 |
|---|---|---|---|
| 3,166,895 | 1/1965 | Slayter | 60/302 |
| 3,186,806 | 6/1965 | Stiles | 60/301 |
| 3,247,666 | 4/1966 | Behrens | 60/292 |
| 3,406,515 | 10/1968 | Behrens | 60/274 |
| 3,544,264 | 12/1970 | Hardison | 60/301 |
| 3,565,574 | 2/1971 | Kearby | 60/301 |
| 3,599,427 | 8/1971 | Jones | 423/212 |
| 3,637,344 | 1/1971 | Thompson | 60/301 |
| 3,644,098 | 2/1972 | Palma | 23/288 F |
| 3,662,540 | 5/1972 | Murphey | 60/289 |
| 3,719,739 | 3/1973 | Thompson | 60/301 |
| 3,733,181 | 5/1973 | Tourtellotte | 60/300 |
| 3,757,521 | 9/1973 | Tourtellotte | 60/274 |
| 3,773,894 | 11/1973 | Bernstein | 23/288 F |
| R25,576 | 5/1964 | Cornelius | 60/301 |

Primary Examiner—Douglas Hart
Attorney, Agent, or Firm—Donald R. Bahr

[57] ABSTRACT

The emission of noxious substances from an effluent arising from incomplete combustion of a hydrocarbon fuel is minimized by a process including the steps of sequentially: oxidizing a portion of the total oxidizable components; lowering the oxides of nitrogen content in the effluent by chemical reduction at an elevated temperature; and further oxidizing the remaining oxidizable components in the effluent to an acceptable level. The process is illustrated to be applicable particularly to motor vehicles having internal combustion engines powered by hydrocarbon fuels.

13 Claims, 6 Drawing Figures

TREATMENT OF GASEOUS EFFLUENT

DISCLOSURE OF THE INVENTION

1. Field of the Invention

This invention relates to air pollution caused by the gaseous effluent of combusted hydrocarbon fuels being discharged into the atmosphere, and to alleviating atmospheric pollution by treating the gaseous effluent prior to discharge to minimize pollutants therein. More particularly the invention treats the gaseous effluent by a combination of sequential steps to eliminate and/or to lower its content of hydrocarbons, carbon monoxide, nitrogen oxides and other gases through their conversion into non-polluting carbon dioxide, nitrogen, water vapor and other gases.

2. Prior Art

The discharge of a gaseous effluent arising from combustion of hydrocarbon fuels into the atmosphere is a recognized source of air pollution. Internal combustion engines are known to emit exhaust effluents containing substantial amounts of undesirable hydrocarbons, carbon monoxide, and oxides of nitrogen into the atmosphere. These undesirable materials upon introduction into the atmosphere result in atmospheric pollution. There exists much activity toward overcoming this air pollution problem by avoiding and/or minimizing introduction into the atmosphere of exhaust effluents containing undesirable materials.

A theoretical approach to eliminate and/or minimize air pollution, caused by exhaust emissions being discharged into the atmosphere, would be to provide for complete combustion of the hydrocarbon fuel thereby discharging an exhaust effluent free from, or relatively free from products other than carbon dioxide, water, and nitrogen. However, internal combustion engines in motor vehicles, inherently are unable to function to provide the continuous steady-state and more complete combustion obtainable in continuous flame type and similar combustion apparatuses. In a gasoline-fueled internal combustion engine powering a motor vehicle, a large number of individual combustions occur within a short time and are repeated to provide a desired mechanical energy output. The vehicle's operation also places demands on the engine such that it must be readily started from both cold and hot conditions, be operable in idle, function smoothly over a wide range of power outputs, permit rapid acceleration and deceleration, permit vehicular steady-speed cruisings at numerous speeds, and the like. At specific times various demands are imposed, and as a direct result thereof the engine's exhaust effluent varies in composition as specific demands on the engine are varied.

Theoretically for complete combustion of hydrocarbon fuels there is required a stoichiometric ratio of air and fuel. One might seek to provide a more complete combustion within the engine and thus produce a resultant exhaust effluent therefrom containing only harmless products. Efforts in that direction, however, encounter an additional problem in that air is commonly used for combustion and air contains nitrogen. Under various engine operating conditions, some portion of this nitrogen is converted into oxides of nitrogen whose subsequent discharge with the exhaust effluent contributes to air pollution. Thus, with present-day vehicular engines operating largely with incomplete combustion of a hydrocarbon fuel/air mixture, the exhaust effluent therefrom includes various percentages of carbon monoxide, unburned hydrocarbons, carbon, oxides of nitrogen, and other gases and also generally various gaseous compounds of sulfur, lead, bromine, chlorine, phosphorus, etc., (these various gaseous compounds arising when impurities are present or from various additives included in the combusted fuel). Accordingly a need exists to treat engine exhaust effluents to eliminate, or at least to minimize to acceptable levels, the hydrocarbon, carbon monoxide, and oxides or nitrogen contents of the exhaust effluent.

Various approaches and efforts of the art to answer this need are illustrated by the following: One approach has been to seek combustion apparatuses other than the conventional internal combustion engine for powering vehicles. Effort to modify the present-day internal combustion engine to provide a more complete combustion therein, and thus decrease pollutant content of its exhaust effluent, is still another approach. Additionally, portions of the exhaust effluent may be recirculated to be included with the intake air/fuel mixture. This can effectively lower combustion temperatures which in turn retards the formation of oxides of nitrogen. In still another approach, afterburner-type devices, e.g., thermal reactors or catalytic converters, are utilized to further oxidize oxidizable components or chemically reduce reduceable components in the exhaust effluent before discharge into the atmosphere. In still some other approaches, various combinations of the foregoing are advocated and taught. However, to date, no approach has provided a satisfactory solution meeting commercial acceptance and the standards for emissions sought and desired by industry and government.

Of greatest interest to the present invention's process are those approaches, used with internal combustion engines, which include an oxidation and/or chemical reduction treatment of the exhaust effluent. Illustrative teachings thereof include: U.S. Pat. No. 3,220,179, Bloomfield, which relates to a catalytic afterburner device for purifying exhaust gases of an internal combustion engine. In operation of this device, atmospheric air is introduced, except during cruise operation of the engine, into the exhaust effluent prior to its passing over a catalyst means. The air introduction functions to provide an afterburner effect to promote combustion of unburned substances in the exhaust effluent. The catalyst means functions to accelerate combustion of unburned hydrocarbons and other noxious fractions. The catalyst, when no air is admitted during cruise, operates in a favorable low oxygen environment for the oxidation-reduction process whereby carbon monoxide reacts with nitric oxide to produce carbon dioxide and nitrogen. Under operating conditions during which air is supplied, the same catalyst in the presence of this additional air also acts as a catalyst for the combination of oxygen with carbon monoxide and unburned hydrocarbons.

U.S. Pat. No. 3,581,490, Morris, concerns an exhaust gas treatment in which oxides of nitrogen in the exhaust gas are reduced by carbon monoxide in the presence of a catalyst and the treated exhaust effluent therefrom is subjected to an oxidizing system, including air addition, for oxidizing carbon monoxide and hydrocarbons, with the high temperature of this oxidized effluent used to preheat the exhaust gas passing into the catalytic reduction zone for oxides of nitrogen.

U.S. Pat. No. 3,554,264, Hardison, teaches a two-stage catalytic treatment of engine exhaust gases by passing the hot gas exhaust stream without cooling and without added air through a first catalyst section to effect reduction of nitrogen oxides and then mixing air with the resulting stream which passes through a second-stage catalyst to effect more complete oxidation of carbon monoxide and unburned hydrocarbons.

U.S. Pat. No. 3,406,515, Behrens, concerns an exhaust system afterburner in advance of a catalytic reactor. A controlled air introduction in at least stoichiometric ratio adjacent and downstream of the exhaust valves provides at least 30 percent conversion in the hydrocarbon content initially present in the exhaust gases before they enter the catalytic reactor where a catalytic afterburning further reduces unburned hydrocarbons. When the temperature at the catalyst exceedes 1,600°F, means are provided for lowering its temperature by bypassing the catalyst bed.

Also of interest are processes involving a thermal afterburning for introduction of air or an oxidizing fluid at the valve ports prior to a catalytic reactor such as illustrated by: U.S. Pat. Nos. 3,247,666, 3,402,550 and 3,247,665, Behrens; and U.S. Pat. No. 3,495,950, Barber et al. Further illustrating the state of the art, there are varied and numerous publications such as the "Society of Automotive Engineers," Publications Nos. 710289, 710291, 710293, and 720209. Prior art teachings are very plentiful and only a few have been mentioned.

SUMMARY STATEMENT OF THE INVENTION

The present invention resides in a method for the treatment of the gaseous effluent from an incompletely combusted hydrocarbon fuel and in particular treatment steps including their combination and the results provided, as well as the sequential order of application of the steps, various process parameters, and operating details as will be apparent from the description presented herein, including drawing figures, and as particularly and specifically set forth in the specific examples and appended claims.

DETAILED DESCRIPTION OF THE INVENTION

Broadly stated, the method of the invention is termed to be the treatment of the gaseous products of incomplete combustion of a hydrocarbon fuel by the sequential steps of limited oxidation, chemical reduction, and oxidation. More specifically, the method of the invention treats a gaseous effluent from incomplete combustion of a hydrocarbon fuel by the sequential steps of: (1) oxidizing a portion of the total oxidizable constituents of the effluent, without completely depleting the carbon monoxide content of the effluent, through introduction into the effluent of an effective amount of an oxygen-containing gas; (2) exposing said effluent to environmental means (described later in detail) effective to chemically reduce the oxides of nitrogen in the effluent to nitrogen and to oxidize an additional portion of the carbon monoxide and hydrogen in the effluent to carbon dioxide and water respectively; (3) exposing said effluent to an oxygen-containing gas in at least an effective amount to further oxidize the remaining oxidizable constituents in the effluent.

Throughout this disclosure the term chemical reduction is repeatedly used. As used in this disclosure, this term means reduction in the classical chemical sense, namely, a lowering of a valence state. For example, in this disclosure reference is repeatedly made to the reduction of oxides of nitrogen. For example, in the reduction of nitric oxide, NO, to nitrogen, nitrogen is altered from a +2 valence state to a 0 valence state. In this example, a reduction in the classical chemical sense was effected on nitric oxide.

Figure 1:
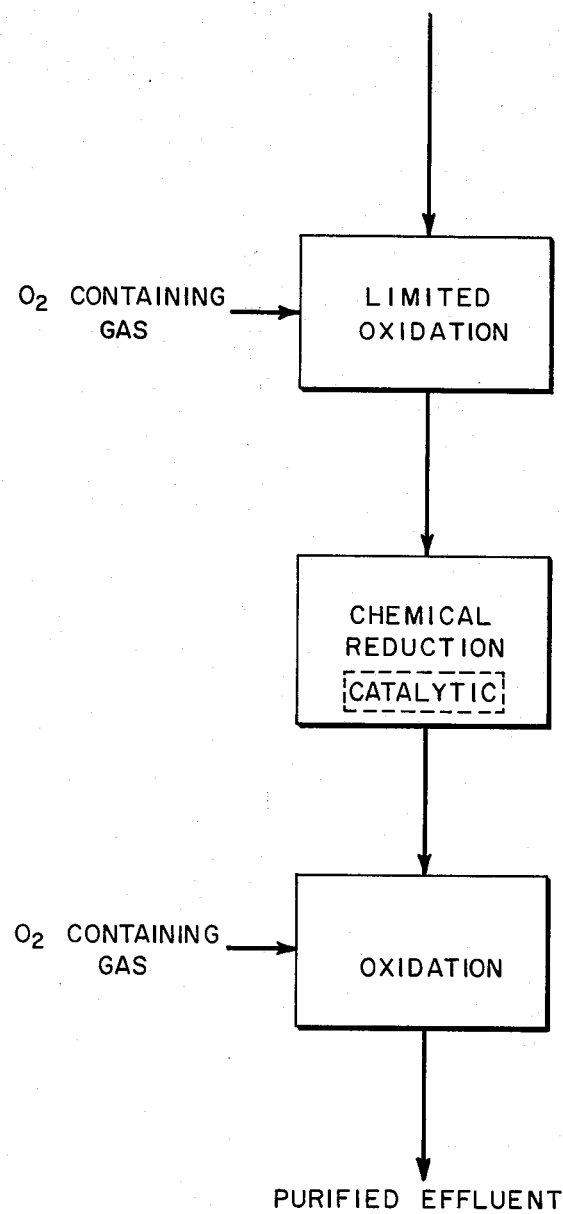
FIG. 1 is a schematic flow sheet in block format of the method of the invention.

With reference to the drawings, wherein the same number is used for like components, FIG. 1 is a schematic flow sheet of the invention's process. In FIG. 1 a gaseous effluent from an incompletely combusted hydrocarbon fuel flows sequentially through three treatment steps and emerges therefrom as a purified effluent. In the first treatment step, an oxygen-containing gas in an amount sufficient to effect limited oxidation of the effluent is introduced into the effluent and a limited oxidation of the oxidizable constituents in said effluent is effected. In the second step, the partially oxidized effluent is subjected to a chemical reduction zone, which may be catalytic. In the third step, an oxygen-containing gas is introduced to the treated effluent from the second step and an additional oxidation is effected to remove and/or additionally lower the level of oxidizable constituents remaining in the treated effluent.

Figure 2:
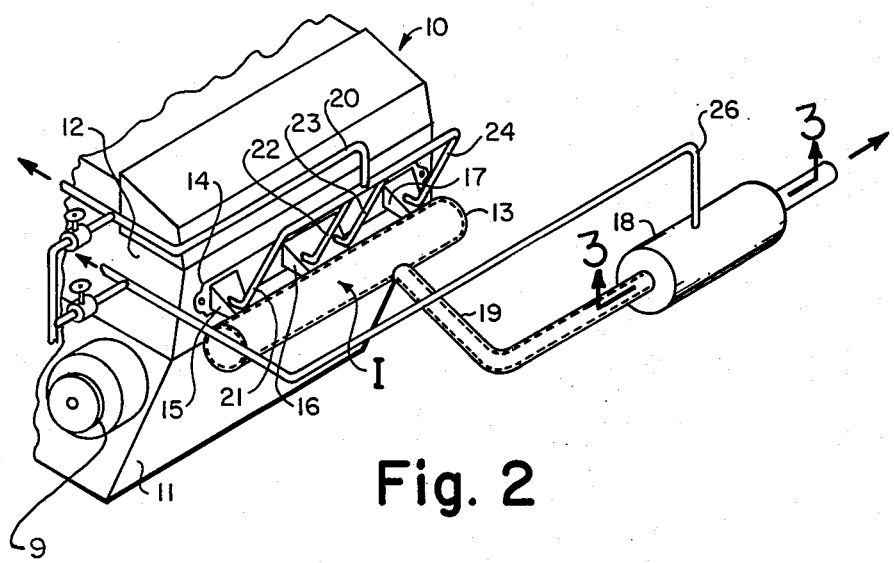
FIG. 2 is a schematic drawing of an apparatus embodiment employable for execution of the method of the invention.
Figure 3:
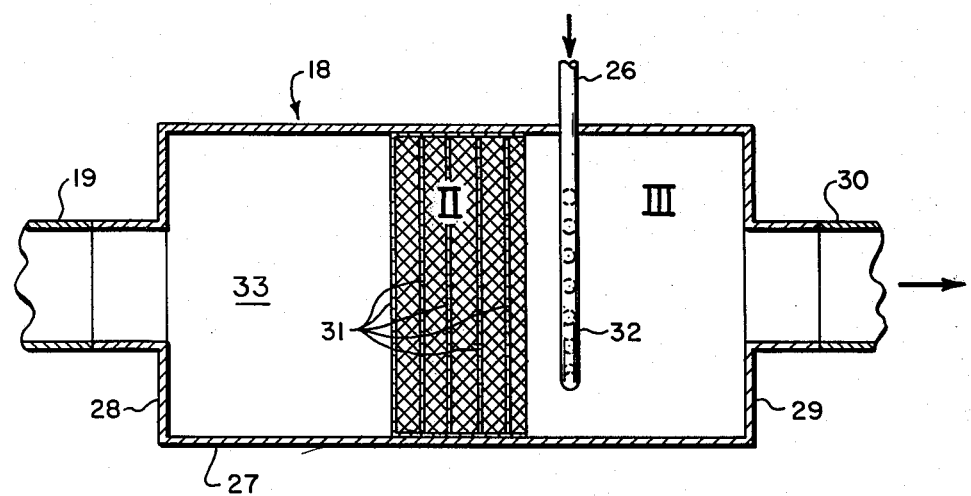
FIG. 3 is a schematic drawing of a longitudinal cross-section view taken on line 3—3 of a portion of the FIG. 2 apparatus to illustrate more clearly the construction and function of that portion.

FIGS. 2 and 3 illustrate an apparatus suitable for practice of the method of the invention. In these FIGURES, there is illustrated a portion of an internal combustion engine 10 of the reciprocating piston type, the engine 10 including a cylinder block 11 and a cylinder head 12. Disposed adjacent the cylinder head 12 is a hollow elongated member or manifold reactor 13, the manifold reactor's construction includes a plate or flange 14 and a plurality of tubular means 15, 16 and 17 joining the manifold reactor 13 with the plate 14.

The plate 14 is secured to the cylinder head 12 by suitable means (not shown). The manifold reactor or hollow member 13 receives exhaust effluent from the four cylinders in the illustrated portion of the cylinder head 12. FIG. 2 illustrates a portion of a V-shaped eight-cylinder engine, and a similar arrangement of elongated member 13, plate 14, and tubular gas passage means 15, 16 and 17 is provided at the opposite side of the engine.

In the illustrated embodiment, the elongated member or manifold reactor 13 is of generally cylindrical shape and receives exhaust effluent through means 15, 16 and 17 into an interior zone I encompassed by the member 13. Disposed at a region spaced from manifold reactor 13 is a post-manifold REVERTER device 18. The apparatus of this invention is called the Reverter system and the process of this invention the Reverter process. The post manifold Reverter device 18 is part of the Reverter system hereinafter referred to as the PMR device. Manifold reactor 13 connects by a tubular means or pipe 19 to device 18.

Air is supplied by engine driven air pump 9 and flows through a central tubular means or air passage conduit 20 into and through a plurality of branching tubular means or individual air passage conduits 21, 22, 23 and 24, and therefrom flows into tubular means 15, 16 and 17 with conduit 21 introducing air into tubular means 15, conduits 22 and 23 introducing air into tubular means 16, and conduit 24 introducing air into tubular means 17. In the practicing of the invention's method, air from conduits 21, 22, 23 and 24 enters tubular means 15, 16 and 17 and mixes with a hot exhaust effluent from the engine's cylinders and the invention's first step, i.e., limited oxidation, is accomplished. The limited oxidation predominantly occurs within the interior zone I of manifold reactor 13, although a portion of the limited oxidation takes place upstream therefrom within the tubular means 15, 16 and 17 and also downstream therefrom, such as within pipe 19 and chamber 33.

Air is provided by air pump 9 and flows through an air tube means or air passage conduit 26 into PMR device 18. Device 18 of the illustrated embodiment is of general tubular-like configuration with an outer tubular shell means or housing 27. Device 18 at its upstream end receives treated effluent from zone I through pipe 19. The upstream end of device 18 is closed by an end cap means or plate 28 except for an opening of pipe 19 into device 18. The downstream end of device 18 is closed by an end cap means or plate 29 except for an opening into a tubular means or exit pipe 30 for flowing effluent to exit from device 18 after treatment therein.

Within device 18 are located a plurality of baffles 31. In the illustrated embodiment, perforated, foraminous or the like baffles 31 are positioned perpendicular to housing 27, extend to contact and to fasten to housing 27 by a fastening means not illustrated, and are located in device 18. When a specific catalyst is utilized, for example, copper, the catalyst can be present as a coating on surfaces of baffles 31 and/or interior surfaces of device 18. Air tube means 26 enters housing 27 of device 18 downstream and at a location in close proximity to the plurality of baffles 31. Air tube means 26 within housing 27 is a perforated tube or porous means 32 extending into housing 27 to distribute air within housing 27.

In practicing the invention's method, flowing effluent from manifold reactor 13 passes by means of pipe 19 into device 18. Within device 18 the flowing effluent passes through baffles 31 and thereabout the invention's second step, i.e., chemical reduction, is accomplished. FIG. 3 includes a generally designated chemical reduction zone II to illustrate where chemical reduction is accomplished. A major portion of the chemical reduction is accomplished in the near proximity of and within a region bounded by the plurality of baffles 31, although portions of the chemical reduction can take place upstream of baffles 31. The flowing effluent exiting from baffles 31, and shortly after emerging therefrom, mixes with air introduced through air tube means 26 and perforated tube 32. Upon introduction air mixing with the flowing effluent, there initiates the invention's third step, i.e., oxidation. The oxidation predominantly takes place near to and downstream of perforated tube 32 within device 18 in a generally designated zone III, although oxidation continues to some extent further downstream with a portion of the oxidation taking place within exit pipe 30. In accordance with this invention a purified effluent emerges from pipe 30.

A detailed description of additional apparatus for use in accordance with this invention is given in an application entitled "System and Apparatus for Processing and Treating Exhaust Gases," Ser. No. 243,811, filed concurrently with this application, now abandoned.

More particularly and as an illustrative general descriptive embodiment of the invention's method, a gasoline-fueled spark-ignition internal combustion engine is operated under rich carburetion which means the actual ratio of air to fuel in the combustion chambers is less than the thereotical stoichiometric ratio required to effect complete combustion of the hydrocarbons present to carbon dioxide and water. Under these operating conditions, the exhaust effluent from the engine contains relatively high levels (i.e., from a pollution viewpoint) of unburned hydrocarbons and carbon monoxide, and an appreciable amount of oxides of nitrogen. The exhaust effluent also contains a large amount of nitrogen, a relatively large amount of carbon dioxide, water vapor, hydrogen, and a small amount of oxygen. An oxygen-containing gas such as air, is added to the effluent, in a limited amount less than that necessary to affect complete oxidation of the oxidizable constituents in the exhaust effluent. As a result of this partial oxidation, the temperature of the effluent is significantly increased. This hot effluent then is exposed to an environmental means to chemically reduce oxides of nitrogen to nitrogen and to oxidize additional carbon monoxide and hydrogen to carbon dioxide and water respectively (for example, the effluent which is at a temperature between 1,550°, to 1,800°F is passed through a chamber containing stainless steel baffles). The effluent after passing through this environmental means, has a lower concentration of oxides of nitrogen. There then is introduced into this effluent an oxygen-containing gas, such as air, in an amount effective to substantially oxidize the remaining oxidizable constituents. The resulting effluent now consists essentially of: nitrogen, water vapor, carbon dioxide, oxygen, hydrogen and trace amounts of other gases.

Without going into the detail of the various chemical reactions taking place upon incomplete combustion of a hydrocarbon fuel in an internal combustion engine it suffices that an exhaust gas effluent therefrom generally contains various amounts of unburned hydrocarbons, carbon monoxide, carbon dioxide, hydrogen, water, oxides of nitrogen, ammonia, nitrogen and other gases. For purpose of this invention the carbon monoxide concentration of the effluent shall be between 0.1 and 15 percent, with a more preferred range being between 5 and 10 percent with a most preferred range being between 7 and 10 percent.

Upon further combustion of that effluent, such as by limited addition of air thereto under requisite combustion conditions for the effluent, the reactions which are most probably occurring are described by the below listed equations:

(1) $CO + \frac{1}{2} O_2 \rightarrow CO_2 + \text{heat}$
(2) $2HC + 2\frac{1}{2} O_2 \rightarrow 2 CO_2 + H_2O + \text{heat}$
(3) $H_2 + \frac{1}{2} O_2 \rightarrow H_2O + \text{heat}$ Concurrently therewith occurrence of the following additional reactions also is possible:

(4) $NO + 2\frac{1}{2} H_2 \rightarrow NH_3 + H_2O + \text{heat}$
(5) $CO + H_2O \rightleftarrows CO_2 + H_2$
(6) $HC + 2 H_2O \rightleftarrows CO_2 + 2\frac{1}{2} H_2$
(7) $2NH_3 + O_2 \rightleftarrows 39\ 2NO + 3H_2$ with still other reactions also being possible.

In equation (2) and also throughout this disclosure, the term HC is used as abbreviated nomenclature to designate in general a hydrocarbon molecule which is composed of hydrogen and carbon atoms. The usage of this term simplifies and makes unnecessary the mentioning of a specific hydrocarbon molecule. The use of the term HC is commonly accepted in the prior art.

As a result of the conversion of oxides of nitrogen by carbon monoxide it is understood by one skilled in the art that the concentration of oxides of nitrogen in the initial effluent must bear a relationship to the concentration of carbon monoxide therein. Generally it is preferred that the concentration of oxides of nitrogen in the initial effluent be less than 700 PPM and more preferably less than 300 PPM.

One finds the summed reactions overall to be exothermic in nature. Thus, the sensible heat content of the effluent would be expected to increase and produce a temperature rise in the effluent. A temperature increase is noted in practice. The summed reactions also indicate that the effluent, after its limited oxidation, would contain decreased amounts of carbon monoxide, hydrocarbons, hydrogen and nitric oxide and increased amounts of carbon dioxide, water and nitrogen.

Such expected increases and decreases in the practice of this inventin are observed. The treatment of the exhaust effluent as described herein, by the addition of a limited amount of an oxygen containing gas, such as air, which produces limited oxidation in the effluent, is termed the first step of this invention.

Illustrative thereof are typical data, as follows, of an exhaust effluent resulting from the combustion of an air/gasoline mixture with a 10.1 to 1 weight ratio in a steady-state operation of an internal combustion engine and of the same effluent after being subjected to a first step limited oxidation treatment.

two in the first step. However, the above data does not exclude that other described reactions and even still other not mentioned possible reactions also are proceeding concurrently to some extent. When the limited oxidized effluent leaves the limited oxidation first step of the invention's process and enters into the invention's second treatment step, it is likely that the various forgoing discussed reactions still are proceeding to some extent and that various reaction equilibriums may be not be fully stabilized.

In the invention's second step there is provided an environmental means primarily conducive to lowering the oxides of nitrogen content of the effluent. This environmental means is providable by physical conditions and process parameters and/or by catalytic means. The purpose of a catalyst is to accelerate the rate at which one or more thermodynamically possible reactions approach equilibrium. In a system in which several reactions are possible, an ideal catalyst will accelerate only those reactions producing the desired products. It is known that the following reaction is catalyzable:

(8) $NO + CO \rightarrow \frac{1}{2} N_2 + CO_2 + \text{heat}$

For example, the below listed reactions should be noted relative to how copper may catalyze the nitric oxide - carbon monoxide reaction (8).

(9) $2NO + 2Cu \rightarrow 2CuO + N_2 + \text{heat}$
(10) $CuO + CO \rightarrow Cu + CO_2 + \text{heat}$
(11) $CuO + H_2 \rightarrow Cu + H_2O + \text{heat}$ The exist numerous teachings of this nitric oxide reduction/carbon monoxide oxidation reaction, as well as mechanisms by which it proceeds and suitable catalyst therefor. Particularly suited for use in this invention as catalyst are members selected from the group consisting of supported and unsupported metals and metal oxides and alloys and mixtures thereof of Groups I-B and IV to VIII of the Periodic system. Some of these teachings have already been cited in the prior art discussion of this disclosure. Some additional illustrative art teachings thereof, but not inclusive of all, are U.S. Pat. No. 3,565,574, SAE Publications 710291 and 710014, January 11–15, 1971.

Stainless alloys are suitable catalysts for use in accordance with this invention. Suitable stainless alloys and forms thereof are: Monel 400 curled wool, Monel 400 wire mesh, Inconel 600 wire mesh, 304SS wire mesh, Inconel 600 wire mesh with copper strike, 304SS with copper strike, RA 330 alloy with and without copper strike.

In addition thereto composite catalyst which comprise glass fibers on which are plated copper oxide, copper or platinum are useful in this invention.

The above description mentions several specific alloys, the composition of these alloys is specified in Table 1a:

TABLE 1

| | Exhaust Effluent Content | | | | | | Temp °F |
|---|---|---|---|---|---|---|---|
| | CO (ppm) | NO (ppm) | HC (ppm) | CO$_2$ (%) | H$_2$ (ppm) | N$_2$ (%) | |
| Before Limited Oxidation | 84,000 | 93 | 2,560 | 10.9 | 31,800 | 78.1 | 1180 |
| After Limited Oxidation (a) | 21,000 | 71 | 9–39 | 15.6 | 9,600 | 81.3 | 1823 |

(a) Uncorrected for a dilution arising because of added air increasing the effluent volume. Multiply reported values, except for N$_2$ by ~ 1.14 to provide comparable quantities. All dry values.

From the foregoing it will be noted that most probable reactions occurring during the invention's limited oxidation first step are those reactions described by equations (1), (2) and (3) with the reaction of equation (2) proceeding closer to completion than the other TABLE 1a*

| ALLOY | CARBON | NICKEL | SULFUR | IRON | SILICON | CHROMIUM | COPPER | MANGANESE |
|---|---|---|---|---|---|---|---|---|
| Inconel 600 | .15 | 72 | .015 | 10 | .50 | 16 | .50 | 1.00 |
| Monel 400 | .30 | 66 | .024 | 2.5 | 50 |  | Balance | 2.00 |
| RA 330 | .05 | 35 | .015 | 43 | 1.25 | 19 |  | 1.50 |
| 304SS | .08 | 10 | .030 | Balance | 1.00 | 19 |  | 2.00 |

*All parts in percentage by weight

It can be noted that in addition to the most probable reaction (8), i.e., catalytic reduction of nitric oxide by carbon monoxide, other reactions are possible, including catalytic reductions of nitric oxide by hydrocarbon and hydrogen (reactions (12) and (13) below). Also in the presence of the catalysts useful for reaction (8) and especially since water is present, there is a great likelihood of a directing influence by the water-gas-shift reaction (5) with carbon monoxide being involved.

(12)  $2NO + HC \rightarrow N_2 + CO_2 + \frac{1}{2} H$
(13)  $NO + H_2 \rightarrow \frac{1}{2} N_2 + H_2O$ As in the first step of the invention's process, the reactions that probably occur in the second step are at least several with most likely a number proceeding concurrently. Favoring the probability of reaction (8) occurring, (and thus (9) and (10) and (11) when employing a copper catalyst), is the small exotherm noted, namely, the small temperature increase of the effluent upon passing through the second step reduction zone. Also favoring the occurrence of these reactions is a significant lowering in the oxides of nitrogen content in the second step. An examination of typical data, given below, of an exhaust effluent after its limited oxidation and at its entry into and exit from the second step is illustrative of the effects produced by the invention's second step.

Even after the limited oxidized and chemically reduced effluent leaves the second step of this invention and enters the third step of the invention's process, it is likely a significant number of the various aforegoing reactions still are continuing to some extent and also that some of the various reaction equilibriums are not fully stabilized.

Upon leaving the second step and shortly thereafter, air is introduced into the flowing effluent and the third sequential step of the invention's process is accomplished. The introduction air, because of its oxygen content, makes probable the occurrence of oxidation reactions described by equations (1) and (3). The reaction of equation (2) probably takes place to some extent, although analyses indicate there is very little hydrocarbon remaining to be oxidized. Likewise as in the other steps, upon effluent entry into and during the third step, various of the already mentioned reactions, and even others not mentioned, most likely are occurring to some extent with various reaction equilibriums likely not fully stabilized. Of particular significance is a probability that the water-gas-shift equation (5) performs a major role in the significant lowering in content of the oxidizable components. Analytical data of the effluent's composition at several different locations downstream of the limited oxidation step reveal that the relative amounts of a carbon monoxide, water, carbon dioxide and hydrogen closely approximate ratios satisfying the equilibrium constant of the water-gas-shift equation (5). Most likely reactions of equations (1), (3) and (5) are predominant throughout the third step of the invention's process. An examination of typical and representative data of a limited oxidized and chemically reduced flowing effluent just before the point of air injection in the third step and at a location well downstream from the point of air injection supports the foregoing understanding. This data is listed in Table 3.

TABLE 2

Exhaust Effluent * Content

|  | CO (ppm) | NO (ppm) | HC (ppm) | $CO_2$ (%) | $O_2$ (%) | $H_2$ (ppm) | $N_2$ (%) | $H_2O$ (%) | $NH_3$ (ppm) | Temp. °F |
|---|---|---|---|---|---|---|---|---|---|---|
| At Entry to Step two ** | 21,000 | 71 | 9–39 | 15.6 | 1.3 | 9,600 | 81.3 | 11.0 | 0.5 | 1823 |
| After Exit From Step Two ** | 14,000 | 5 | 12 | 15.2 | 0.8 | 3,900 | 82.0 | 13.1 | 1.6 | 1850 |

* Of an incompletely combusted hydrocarbon fuel and after first step limited oxidation thereof.
** Uncorrected for dilution arising because of air added for first step limited oxidation which increases effluent volume. Except for nitrogen and oxygen multiply reported values by ~ 1.14 to provide comparable quantities. Dry values except for $H_2O$.

TABLE 3

Exhaust Effluent * Content

|  | CO (ppm) | NO (ppm) | HC (ppm) | $CO_2$ (%) | $O_2$ (%) | $H_2$ (%) | $N_2$ (%) | Temp. °F |
|---|---|---|---|---|---|---|---|---|
| Upon Entry into third step (a) | 14,000 | 5 | 12 | 15.2 | 0.8 | 3900 | 82.0 | 1850 |
| At tailpipe outlet (b) | 32 | 12 | 0 | 14.5 | 4.1 | 700 | 81.5 | 1587 |

* Of incompletely combusted hydrocarbon fuel after first step limited oxidation and second step chemical reduction thereof.
(a) Uncorrected for dilution because of air added in the invention's first step. Except for nitrogen and oxygen multiply reported values by ~ 1.14 to provide absolute quantities. All values in this Table are dry values.
(b) Uncorrected for dilution because of air added in the invention's first step and air subsequently added in the method's third step. Except for nitrogen and oxygen multiply reported values by ~ 1.3 to provide comparable quantities.

In the practice of the invention's process, a number of process parameters and factors are of importance, and especially so for optimum and preferred practice of the process. Of import is that the effluent being treated orgininate from an incompletely combusted hydrocarbon fuel, or at least the effluent being treated by the process be of the nature and composition of those effluents arising from an incompletely combusted hydrocarbon fuel.

The treated effluent, whatever its source, will contain carbon monoxide, and oxides of nitrogen and generally hydrocarbons in that these are the particular constituents being eliminated and/or lowered through the practice of this invention. The amounts of these three constituents in the effluent can vary widely with the invention's process still being applicable. Generally, among the three, carbon monoxide will be present in the largest amount, with the hydrocarbons present in the next largest amount and with the oxides of nitrogen present in the least amount.

Except for carbon monoxide and probably hydrogen, the particular levels of the various amounts of these constituents in the effluent are relatively unimportant so long as the amounts present of oxidizable components approximate at least amounts which upon combustion thereof provide an exothermic heat of reaction sufficient to raise the sensible temperature of the effluent being treated to at least 1,550°F at time of entry into the secnd step. Due to a balancing effect at the method's temperature, the equilibrium constant of the water-gas-shift reaction (5) apparently dictates that when a carbon monoxide content is specified, then one indirectly also specifies a hydrogen content relationship thereto if water and carbon dioxide are held constant. Not all heat required to raise the temperature of the effluent to at least 1,500°F (at point of entry into the second step) has to be provided through the reaction of equation (1), some may and can be contributed by the exothermic heat of the reaction of equations (2) and (3). The carbon monoxide level in the effluent being treated should be sufficiently high that only a portion thereof will be oxidized in the first step.

The effluent's temperature also could be raised in part to at least 1,500°F by employing auxiliary external heating means and sources.

Accordingly, in the first step of this invention an amount of an oxygen-containing gas, such as air, less than that necessary to complete oxidation of carbon monoxide is introduced. One adds an oxygen-containing gas, such as air, in an amount effective to promote those oxidation reactions which supply exothermic heat, to the degree that the effluent temperature is raised to at least 1,550°F, taking into account the heat contribution, if any, from auxiliary external heating means and sources.

Also within that range of amounts, the supplied maximum amount will be less than an amount effective to completely oxidize the carbon monoxide therein. The stoichiometric amount of carbon monoxide remaining in the effluent after limited oxidation must be at least in excess of the stoichiometric amount of oxides of nitrogen therein. By operating in that manner the resulting limited oxidized effluent will be in a state most conductive for the invention's second step, namely, the chemical reduction, in that its free oxygen content will be extremely low and its carbon monoxide content high, both conditions create a reducing environment and favor the reaction of equation (8).

A principal function of the second step is to lower the oxides of nitrogen content. This is accomplished through environmental means which include physical conditions, process parameters and/or catalytic means. Of importance to the environmental means is temperature, with the second step conducted at a temperature generally above 1,550°F., most desirably above 1,700°F, and preferably between 1,725° and 1,875° F. An operative upper limit on temperature exists only as is imposed by the specific materials of the employed apparatus. At the temperatures employed the reaction of equation (8) will proceed.

For practical reasons, including decreased apparatus size and reaction time, it generally is desirable that the environmental means include a catalyst, although a specific incorporation of catalyst is not essential when the apparatus interior is constructed of materials which are catalytically active. With such construction, the chemical reduction will proceed. Various metallic elements in various construction materials, especially nickel, iron and chromium, and possibly refractory materials rather quickly upon exposure to the effluent convert to an oxide form to function as a catalyst whether or not one specifically includes a more "generally known to be useful" catalyst such as copper. This is not to be taken to exclude any included catalyst from being a portion of or supported by a refractory material capable of withstanding useful operating temperatures. Most conveniently and preferably when copper or the like is used, the copper is plated or flash coated on surfaces. Although catalysts, when included, can be activated prior to commencement of the invention's process, such prior activation is unnecessary with the catalyst apparently functioning shortly after the effluent from the first step reaches the second step.

Preferably baffles or the like are included in the second step apparatus to increase area of contacting surfaces for the effluent and to facilitate mixing of the effluent with increased prospects of more thorough contacting of the same with surfaces. Advantageously low catalyst surface areas, compared to those large catalyst surface areas reqired with catalysts operating at several hundred degrees Fahrenheit lower, are satisfactory in the invention's second step with a significant lowering of oxides of nitrogen content being realized. It also should be noted that with conventional construction materials of stainless alloys and the like that the reaction of equation (8) apparently occurs to a reasonable extent upstream from the second step. In a typical practice employing the suitable apparatus means as employed in a later-described example, slightly more than one-half of the total oxides of nitrogen reduction is accomplished within the baffle bed of the invention's second step and the balance accomplished upstream, therefrom.

In the invention's third step, an oxygen-containing gas, preferably air, is introduced into the limited-oxidized and chemically reduced effluent. The introduced amount is at least the stoichiometric amount necessary to oxidize all remaining oxidizable constituents, chiefly carbon monoxide and hydrogen, in the effluent. While somewhat lesser amounts are operative, they are operative only at a sacrifice of not oxidizing completely the remaining oxidizable constituents.

Larger amounts are useful with apparently the only operative limit on the useful maximum amount being that the temperature of the effluent should not be quenched or cooled to a temperature nonconducive to oxidation of the remaining oxidizable constituents, namely, nonconducive primarily to reactions of equation (1) and (3) taking place. Of course from a practical viewpoint, the introduction of an oxygen-containing gas in amounts substantially larger than stoichiometric is also undesirable because of economic reasons. The most useful amounts of oxygen-containing gas introduced for the third step are between 0.8 and 2 times the stoichiometric amount to completely oxidize the remaining oxidizable constituents, and the preferred amount is between 1 and 1.5 times the stoichiometric amount.

Further relative to this invention, the supplied amount of air is an amount effective to provide an effluent after limited oxidation containing at least about 1 percent carbon monoxide and less than 5 percent oxygen. For particularly desirable operation of the second step, the limited oxidized effluent for treatment contains at least about 2 to 3 percent carbon monoxide, and less than about 0.30 percent oxygen.

In this disclosure the term flame oxidation is utilized; this term means that the oxidationn is carried out at a temperature such that luminous energy is emitted.

In a typical operation of the invention's method under the FTP, as hereinafter described, an exhaust effluent's carbon monoxide content is decreased about 98 percent, its hydrocarbon content decreased about 99 percent, and its nitric oxide content decreased about 90 percent. As already mentioned, more than one-half the nitric oxide decrease is accomplished in the second step with an additional portion accomplished in the first step. Substantially all of the hydrocarbon decrease is accomplished in the first step. More than one-half of the carbon monoxide decrease generally is accomplished in the first step, an additional small decrease accomplished in the second step, and the balance of the carbon monoxide decrease accomplished in the third step.

ILLUSTRATIVE SPECIFIC EXAMPLES OF THE INVENTION

EXAMPLE NO. 1

A vehicle equipped with a 250 CID engine was used. The vehicle was equipped with an automatic transmission, engine-driven air pump, and a two-barrel carburetor.

To obtain baseline data this vehicle and engine, as just described, was operated on Indolene Clear fuel and subjected to the Federal Test Procedure (FTP) driving cycle (Federal Register, Vol. 33, No. 108, June 4, 1968). Barometric pressure at time of test was 29.56 in. Hg. Ambient temperature before and after the test was 73°F. At cold idle the engine speed was 2,000 rpm and at hot idle was 750 rpm. Timing was 12° BTC at 900 rpm with no vacuum advance. At idle with no air injection, the carbon monoxide content of the exhaust effluent was 3.9 percent by volume. Analysis of the gaseous effluent from the tailpipe was by means of non-dispersive infra-red (NDIR) analytical instrumentation. In accordance with the FTP measured raw data for each mode of each cycle was corrected and weighted and then summed for each cycle for hydrocarbon, carbon monoxide, and nitric oxide concentrations. Table 4 represents the cycle by cycle composites and the final trip composite for this baseline test.

TABLE 4

| | Baseline Data Weighted Data | | |
|---|---|---|---|
| Cycle | HC (ppm) | NO (ppm) | CO (%) |
| 1 | 25.70 | 43.19 | 0.40 |
| 2 | 12.73 | 58.67 | 0.18 |
| 3 | 11.61 | 62.14 | 0.09 |
| 4 | 12.61 | 75.96 | 0.09 |
| 5 | (not read) | | |
| 6 | 50.01 | 323.08 | 0.35 |
| 7 | 31.96 | 215.15 | 0.33 |
| Sum of Cycles 1–7 | 144.63 1.67 gm/mi | 778.18 1.79 gm/mi | 1.45 31.40 gm/mi |

Following the obtaining of the foregoing baseline data for comparison purposes, this vehicle was modified additionally as follows: port liners were added in the cylinder head to aid in heat retention; the carburetor main fuel jets and the idle jet orifices were enlarged. The exhaust manifolds and balance of the factory-installed exhaust system were removed and replaced with suitable equipment for practice of the invention's process. This equipment comprised, for each side of the engine, a thermal reactor for a portion of the first step limited oxidation connected to a post-manifold Reverter device (PMR) similar to that illustrated in FIGS. 2 and 3 for carrying forth the second step chemical reduction and the subsequent third step oxidation. The PMR device was in turn connected to an exhaust pipe. The thermal reactors were of tubular configuration with a 3-inch diameter inner shell of 0.031 inch thick RA—330 alloy. The inner shell connected to the four ports of each bank of the engine through four runner tubes constructed of RA–330 alloy with two end runner tubes entering the inner shell on its cylindrical surface and the remaining two runners entering each of the ends of the cylindrical thermal reactor. The cylindrical shell of each thermal reactor enclosed a volume of approximately 92 cubic inches, and the total surface area of each thermal reactor approximated 152 square inches. An air injection tube was provided into each engine exhaust port and directed toward the exhaust valve. The outlet tube from the thermal reactor was an extension of one of the end runners. The reactors were insulated exteriorly with three layers of commercially available silica-alumina insulation. An 0.018 inch thick sheet of 304 stainless steel outer wrapper was placed over the insulation surrounding the cylindrical portion of the thermal reactor and additional insulation was wrapped around the runner tubes.

The PMR devices were about 3.5 inch by about 6.25 inch ovals about 12 inches long constructed of 0.031 inch thick RA–330 alloy. Centered in and located at right angles to the direction of effluent flow were five catalyst baffles, each baffle composed of twelve layers of copper coated wire (York No. 2144, 304SS, 0.011 wire). Immediately downstream from the baffles, two air injection tubes entered the PMR device through the side wall with the outlets of the tubes centered in the PMR device. The outlet tube from the thermal reactor connected to the upstream end of the PMR device. An exit tube projected from the outlet end of the PMR device and connected to an exhaust pipe. The PMR devices were also insulated with three layers of insulation and an outer wrap of 0.018 inch thick 304 stainless steel. All connections as well as the exhaust pipe for a distance of approximately three feet downstream of the PMR device were insulated with the aforementioned silica-alumina insulation. The tailpipe was supported by hangers designed to allow for thermal expansion.

The thus-modified and equipped vehicle was then operated on Indolene clear fuel and tested in accordance with the above-described FTP. Timing was adjusted to 0° BTC at 620 rpm, and with no vacuum advance. The engine speed was 1,700 at cold idle and at hot idle was 650 rpm. For approximately the first 60 seconds of the FTP air injection occurred only at the exhaust ports. At idle the carbon monoxide content of the exhaust effluent was about 9 percent and at high speed cruise was about 7–8 percent (these values were observed with no air being injected at any point). Barometric pressure at the time of the test was 29.51 in. Hg. The ambient temperature at start of the test was 73°F and at the end of the test was 75°F. Analysis of the effluent gas exiting from the tailpipes was by NDIR instrumentation. In accordance with the FTP measured raw data for each mode of each cycle was corrected and weighted, and then summed for each cycle for hydrocarbon, carbon monoxide, and nitric oxide concentrations. Table 5 represents the cycle by cycle composites and the final trip composites.

TABLE 5

| Cycle | Test Data Weighted Data | | |
|---|---|---|---|
| | HC (ppm) | NO (ppm) | CO (%) |
| 1 | 1.17 | 3.90 | 0.07 |
| 2 | 0.00 | 3.38 | 0.00 |
| 3 | 0.00 | 2.10 | 0.00 |
| 4 | 0.00 | 2.51 | 0.00 |
| 5 | (not read) | | |
| 6 | 0.00 | 7.31 | 0.00 |
| 7 | 0.00 | 7.10 | 0.00 |
| Sum of Cycle 1–7 | 1.17 | 26.31 | 0.07 |
| | 0.01 gm/mi | 0.05 gm/mi | 1.42 gm/mi |

A repetition was made of the just-described test in accordance to the FTP with the same vehicle modified as previously described for practice of the process of the invention. The test differences therefrom were: the cold idle speed was 1,500 rpm; timing was set at 5° BTC at 620 rpm and with no vacuum advance; for the first 75 seconds of the FTP, air injection occured only at the exhaust ports; the barometric pressure at time of the test was 29.56in. Hg.; and the ambient temperature at start of the test was 72°F and at end of the test was 74°F. Table 6 indicates data from this test.

TABLE 6

| Cycle | Test Data Weighted Data | | |
|---|---|---|---|
| | HC (ppm) | NO (ppm) | CO (%) |
| 1 | 0.95 | 5.66 | 0.04 |
| 2 | 0.00 | 3.89 | 0.00 |
| 3 | 0.00 | 3.40 | 0.00 |
| 4 | 0.00 | 2.68 | 0.00 |
| 5 | (not read) | | |
| 6 | 0.00 | 5.87 | 0.00 |
| 7 | 0.00 | 9.03 | 0.00 |
| Sum of Cycles 1–7 | 0.95 | 30.53 | 0.05 |
| | 0.01 gm/mi | 0.06 gm/mi | 0.95 gm/mi |

Temperature measurements during the preceding two tests were recorded at various thermocouple locations on the apparatus installed for the practice of this invention. The following Table 7 presents illustrative data of those temperature measurements. The temperatures shown are approximate mean temperatures observed during the FTP driving cycle and reflect only stabilized operation, which excludes the initial warm-up period.

TABLE 7

| | Observed Mean Temperatures (°F) With Invention Apparatus | | | |
|---|---|---|---|---|
| | Test No. 1 | | Test No. 2 | |
| Location No.* | Left Bank | Right Bank | Left Bank | Right Bank |
| 1 | 1760 | 1710 | 1750 | 1670 |
| 2 | 1950 | 1950 | 1910 | 1900 |
| 3 | 1660 | 1770 | 1640 | 1690 |

*Thermocouple Locations
1. In line with an exhaust port near the center of the manifold reactor.
2. About the center of the baffles in PMR device.
3. Downstream from baffles in PMR device.

For comparison purposes, the baseline test results and the results of the two tests with suitable equipment for the practice of the invention's process are shown in Table 8. All data was obtained in accordance to the FTP from the vehicle equipped with a 250 CID engine.

TABLE 8

| Baseline Emissions Values | Emissions Values with Invention's Process | |
|---|---|---|
| | First Test | Second Test |
| HC 1.67 grams/mile | 0.01 grams/mile | 0.01 grams/mile |
| NO 1.79 grams/mile | 0.05 grams/mile | 0.06 grams/mile |
| CO 31.40 grams/mile | 1.42 grams/mile | 0.95 grams/mile |

A comparison of the data in the above Table 8 makes readily apparent the significant purification of gaseous effluents provided through practice of the invention.

Example No. 2

To provide baseline data for comparison purposes, a 400-CID V8 engine, coupled to a dynamometer, was operated as follows: Indolene clear fuel was used. Throttle adjustments were made to operate the engine at 1,300 rpm speed with a 16.1 in. Hg. manifold vacuum. Power output was 12.1 HP or equivalent to about a 32 mph cruising speed. Air flow to the carburetor was 47.9 scfm and fuel flow was 0.246 lb/min. to provide an air to fuel ratio of 14.6 to 1. At these operating conditions the following stabilized exhaust effluent temperatures (°F) were noted:

TABLE 9

| Location | Effluent Temperature °F |
|---|---|
| At Exhaust Port | 1087 |
| 3 ft. Downstream from Exhaust Manifold | 930 |
| Just Before Muffler Inlet | 728 |
| 2 ft. Downstream From Muffler Outlet | 580 |

Representative baseline data obtained by averaging raw data and converting wet-gas concentrations to dry-gas values except for water, of the various constituents of the exhaust effluent exiting from the tailpipe at the preceding operating conditions are expressed in Table 10.

TABLE 10

| | | Baseline Effluent Constituent Concentrations | | | | | | |
|---|---|---|---|---|---|---|---|---|
| CO (ppm) | NO (ppm) | HC (ppm) | $CO_2$ (%) | $O_2$ (%) | $H_2$ (ppm) | $N_2$ (%) | $H_2O$ (%) | $NH_3$ (ppm) |
| 2900 | 460 | 240 | 14.8 | 2.2 | 1200 | 81.5 | 12.2 | 2.2 |

The same 400-CID engine was then modified as follows: port liners were added in the cylinder head; the main fuel jets were increased from 0.059 inches to 0.070 inch diameter; the orifices at the idle mixture adjustment screws were increased to 0.073 inch diameter; the orifices in the idle tubes were increased to 0.052 inch diameter, a ported vacuum advance was installed on the throttle plate assembly; a thin plate was installed to block cross-over of exhaust effluent from one cylinder bank to the other; timing was adjusted from 10° BTC to 4° BTC at 635 rpm; the idle was adjusted to increase the carbon monoxide content in the untreated exhaust effluent from about 0.5 percent to about 9.5 percent; an auxiliary air supply capable of providing an accurate and controlled supply of air was used. Suitable equipment for practice of the invention's process was installed on one side of the engine. The suitable equipment installed for practice of the invention's process included a thermal reactor for the first step limited oxidation connected to a PMR device principally for carrying forth the second step chemical reduction and the subsequent third step oxidation. The PMR device connected to an exhaust pipe which in turn was connected to a conventional muffler which was then in turn connected to a tailpipe approximately three feet long. This example employed a thermal reactor and PMR device which closely resembled those employed in the preceding Example 1 in construction and size.

Principal differences from the suitable equipment employed in Example 1 were: the employed thermal reactor was of a length approximating the removed exhaust manifold and was end-capped and of a cylindrical cross-section with flanges therefrom used for bolting the thermal reactor to the engine, with the thermal reactor having a volume of approximately 110 cubic inches, an inner surface area of approximately 192 square inches, and an outlet located toward the bottom and rearward portion of the thermal reactor; the PMR device contained five baffles centered and located therein at right angles to the direction of effluent flow, with each baffle composed of four staggered layers of expanded metal (⅛ × 3/16 openings with 0.031 inch thick stands RA-330) which had been flash coated with copper.

The thus-modified and equipped 400-CID engine, while coupled to a dynamometer, was operated on Inolene clear fuel. Throttle adjustments were made to operate the engine at 1,300 rpm speed with 18.0 in. Hg. manifold vacuum. Power output was 12.1 HP, and alike the immediately foregoing test providing baseline data, was equivalent to about a 32 mph cruising speed. Carburetor inlet air flow was 38.6 scfm and fuel flow was 0.288 lb. min. to provide an air/fuel ratio of 10.1 to 1.

This data calculated to a 1.44 lb. fuel/brake HP-hr. BSFC. An air flow of 6.37 scfm was introduced through the two air injection tubes into the PMR device. At these operating conditions the following stabilized effluent temperatures (°F) were noted:

TABLE 11

| Location | Effluent Temperature (°F) |
|---|---|
| Near Port (approximately 2 in. Downstream from a port air injector) | 1383 |
| At PMR device inlet | 1823 |
| Center of baffles | 1787 |
| Near air injectors in PMR device | 1711 |
| 3 ft. Downstream of PMR device | 1587 |
| At muffler inlet | 1317 |
| At tailpipe 2 ft. from muffler | 982 |

Representative data, obtained by averaging raw data and converting from wet-gas concentrations to dry-gas values except for water, of various constituents of the exhaust effluent exiting from the tailpipe under the preceding operating conditions are as follows:

TABLE 12

| | | Effluent Constituent Concentrations | | | | | | |
|---|---|---|---|---|---|---|---|---|
| CO (ppm) | NO (ppm) | HC (ppm) | $CO_2$ (%) | $O_2$ (%) | $H_2$ (ppm) | $N_2$ (%) | $H_2O$ (%) | $NH_3$ (ppm) |
| 40 | 17 | 0.5 | 13.1 | 4.0 | 600 | 81.0 | 11.0 | 0.5 |

A comparison of the above data with the obtained baseline data of Example 2 serves to make readily apparent the substantial elimination and/or lowering of the hydrocarbon, carbon monoxide, and nitric oxide contents in the exhaust effluent through practice of the process of the invention.

The analytical data reported in Example 2 are the mean average of obtained values. Analysis methods for the various constituents of the gaseous effluent are as follows: nitric oxide by NDIR with some values also verified by chemiluminescence methods; HC by a flame ionization detector; carbon dioxide by NDIR on stream and by a mass spectrometer for container-collected samples; oxygen by a polorgraphic analyzer and by mass spectrometer; hydrogen by mass spectrometer, nitrogen by mass spectrometer and chromographic techniques; water by method 4 of Federal Register, Vol 36., No. 247, page 24887, Dec. 23, 1971; and $NH_3$ by a wet chemical method involving the Kjeldahl nitrogen determination.

Figure 4:
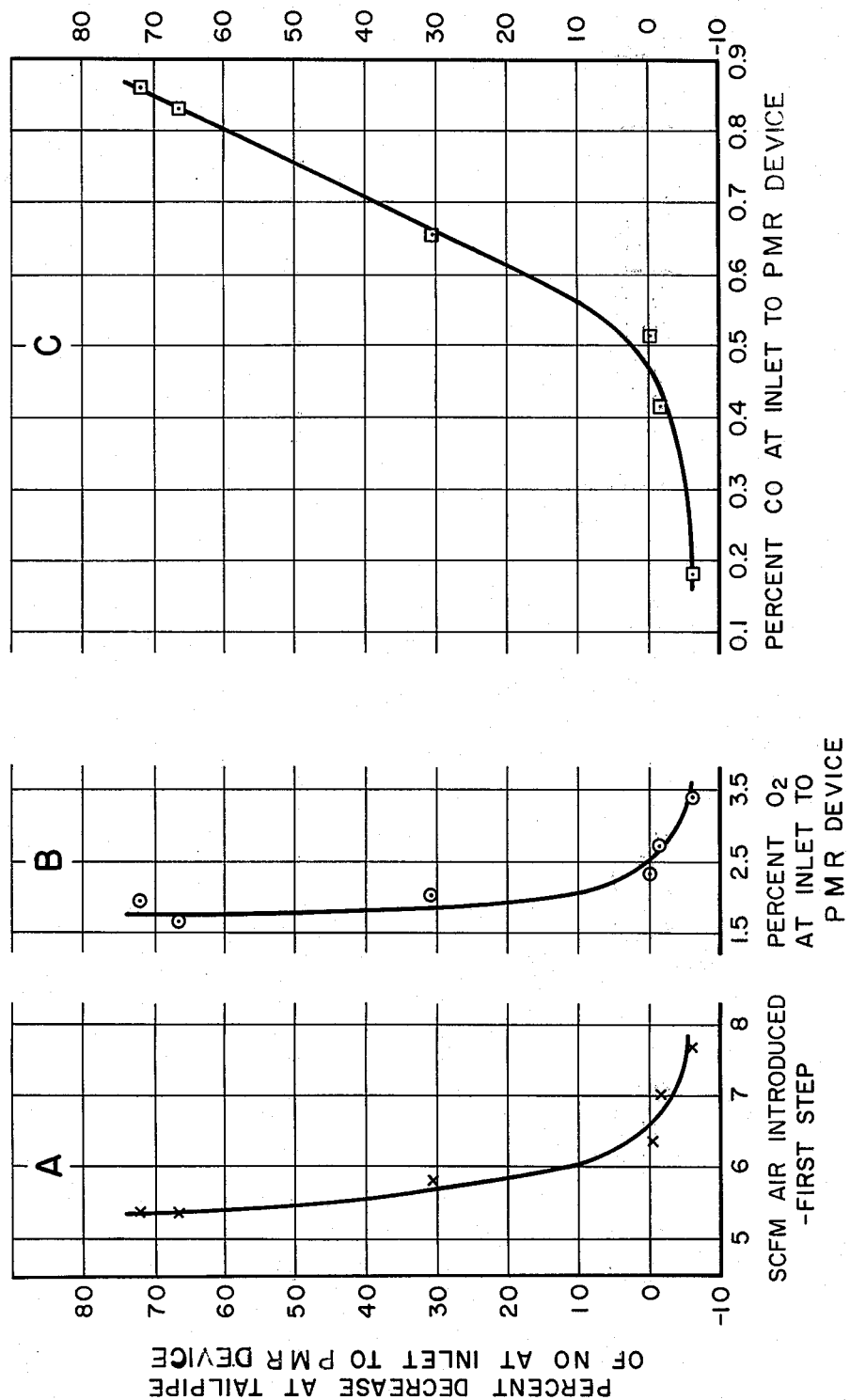
FIG. 4 is an illustrative graphical showing of the decrease at the tailpipe in the oxides of nitrogen entering into the inlet to the PMR device in relation to the amount of air introduced into the first step and the oxygen and carbon monoxide contents of the effluent entering the PMR device, as applicable to hereinafter described Example 2.

With reference to the engine of this example operated in a manner as previously described, FIG. 4 is a graphical presentation of some representative data from a steady-state operation of the engine as adapted to practice the invention's method. Graph A represents the relationship of the percentage decrease of the nitric oxide content at the tailpipe relative to the nitric oxide content entering the PMR device 18 of FIGS. 2 and 3, as a function of the amount of air introduced into the first step, zone I. GRAPH B illustrates the relationship of the percentage decrease of the nitric oxide content at the tailpipe relative to the nitric oxide content entering the PMR device 18 as a function of the oxygen content of the effluent upon entry into the PMR device. Graph C illustrates the relationship of the percentage decrease of the nitric oxide content at the tailpipe relative to the nitric oxide content entering the PMR device as a function of the carbon monoxide content in the effluent upon entry into the PMR device.

For the specific steady state engine operation and practice of the invention's method, from Graph A it is apparent that the amount of air introduced for the limited oxidation first step is important and should not exceed about 5.5 scfm to provide at least a 50 percent decrease in the concentration of nitric oxide. Likewise, from Graph B it is apparent that the oxygen content of the specific limited-oxidized effluent entering the PMR device should not exceed about 1.75 percent to provide at least a 50 percent decrease in the concentration of nitric oxide. Also from Graph C it is apparent that the carbon monoxide content of the specific limited-oxidized effluent entering the PMR device should not be less than about 0.75 percent to provide at least a 50 percent decrease in the concentration of nitric oxide. From the same graphical presentations, it is apparent that no percentage decrease in nitric oxide concentration at the tailpipe results and instead an increase is observed when the air introduced in the first step exceeds about 6.5 scfm, the effluent's oxygen content exceeds about 2.5 percent at entry into the PMR device, and the effluent's carbon monoxide content is less than about 0.47 percent at entry into the PMR device.

Because of the role of the water gas shift reaction a graph, not illustrated, similar to Graph C of FIG. 4, would result in plotting the sum of the hydrogen and carbon monoxide content as the abscissa in place of carbon monoxide.

EXAMPLE NO. 3

A 1972 Pontiac Catalina automobile, having a factory-installed 400-CID V8 engine and equipped with a two-barrel carburetor and an automatic transmission, was modified as follows: exhaust port liners were installed in each engine exhaust port; an engine driven air pump was installed; the factory installed carburetor was replaced by a carburetor providing a richer air/fuel mixture; the exhaust manifolds and balance of the factory exhaust system were removed and replaced with equipment suitable for practice of the invention's process. This equipment, for each side of the engine, included a small volume thermal reactor for the first step limited oxidation connected to a PMR device principally for carrying forth the second step chemical reduction and subsequent third step oxidation.

The thermal reactors each were of 0.031 inch thick RA 330 alloy with an inner shell about 18.5 inches long formed in a horseshoe cross-sectional shape and capped by end plates. Each thermal reactor contained a volume of approximately 100 cubic inches and had an inner surface area of approximately 169 square inches. The thermal reactors were equipped with flanges and with fasteners passing therethrough to bolt the thermal reactors directly to the engine in place of the customary exhaust manifolds. An outlet tube was located toward the bottom and rearward end of each thermal reactor. The thermal reactors were insulated exteriorly with three layers of silica-alumina insulation (such as Johns Manville's 12 lb. density Cerafelt insulation) and the layered insulation surrounded by a wrapping shell of 0.031 inch thick RA 330 alloy. The outlet of each of the thermal reactors connected to the inlet end of a PMR device. Each PMR device was an oval shell approximately 3.5 inches by 6.75 inches, and about 14 inches long constructed of 0.031 inch thick RA 330 alloy. About one-third of the distance downstream from the PMR device inlet five catalyst baffles each of twelve layers of copper-coated wire mesh (such as York No. 2144 Inconel 600, 0.11 inch wire diameter) were mounted at right angles to the direction of effluent flow. The outlets of two air injection tubes which entered through the side wall of the PMR device were centered in the PMR device immediately downstream from the last catalyst baffle. An exit tube projected from the other end of the PMR device and connected to an exhaust pipe. The exhaust pipe was in turn connected to a conventional muffler which was in turn connected to a tailpipe. The PMR devices were wrapped with three layers of insulation and an outer covering of 304 stainless steel. Connections between the thermal reactors and the PMR devices were provided with three-layered insulation and an outer wrapping of aluminum foil. Air tubes were provided from the air pump to air injectors in the engine exhaust ports and to the air injection tube leading into the PMR devices.

Figure 5:
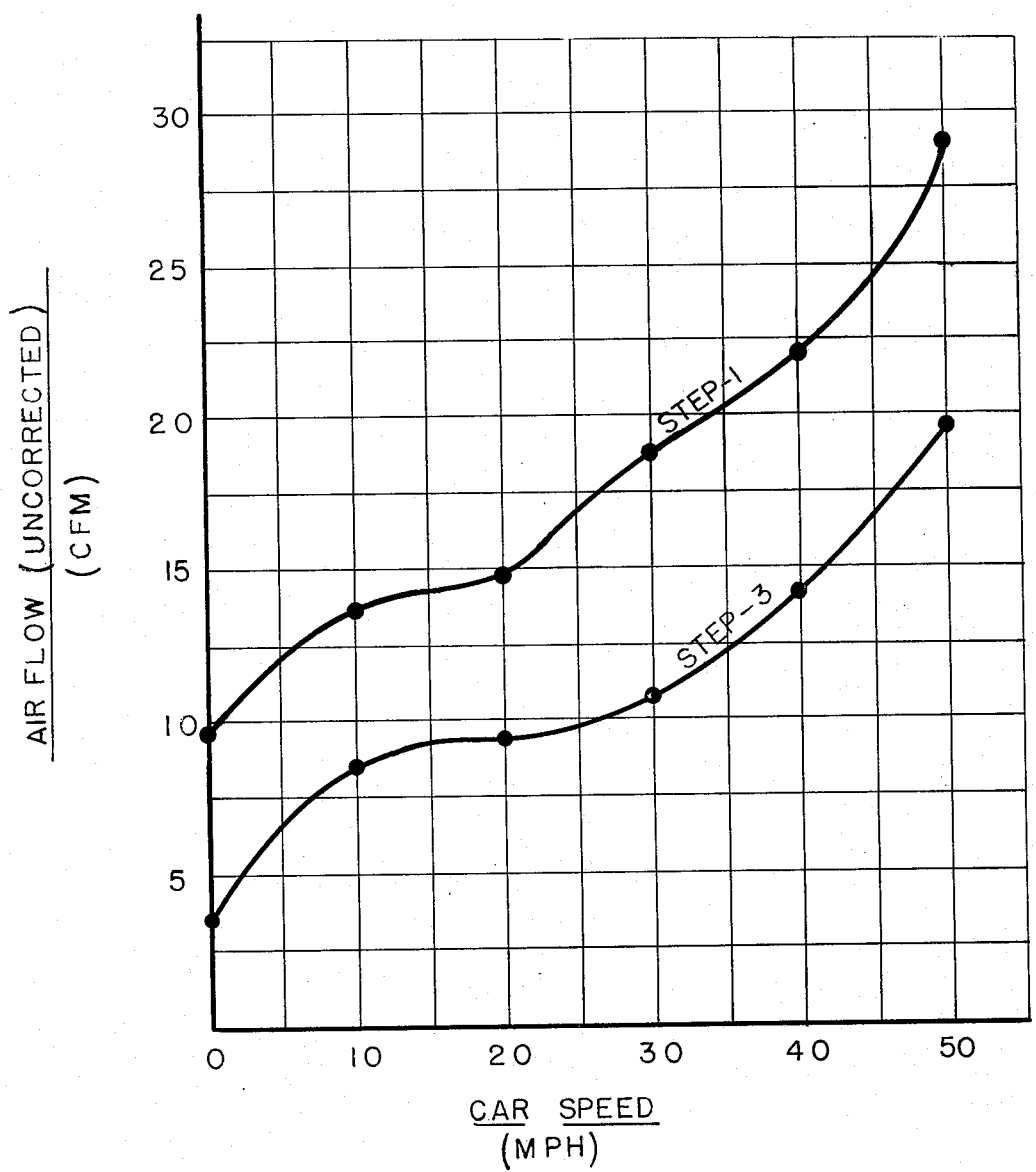
FIG. 5 is an illustrative graphical showing of the air flow rate to step 1 and step 3 of the invention as used in hereinafter described Example 3.

The thus-modified and equipped vehicle then was operated on Indolene clear fuel and subjected to the FTP driving schedule. The choke was manually set. Basic timing was adjusted to 4° BTC at 720 rpm. No vacuum advance was used for approximately the first 120 seconds of the test cycle with vacuum retard used during that period. The engine speed was 1,300 rpm at cold idle and was 600 rpm at hot idle. Air flow rates to the port air injectors and air flow rates to the two air injector tubes entering the PMR device are illustrated in FIG. 5. Flow rates indicate total air flow of steps 1 and 3 to both banks. Barometric pressure at the start of the test was 29.62 inches Hg. The ambient temperature at the start of the test was 76°F and at the end of the test was 77°F. Analysis of the gaseous effluent exiting from the tailpipe was by NDIR instrumentation. In accordance with the FTP measured raw data for each mode of each cycle was corrected and weighted and then summed for each cycle for hydrocarbon, carbon monoxide, and nitric oxide concentrations. Table 13 represents the cycle by cycle composites and the final trip composites.

TABLE 13

| Cycle | Summed Concentrations Weighted Data | | |
|---|---|---|---|
| | HC (ppm) | NO (ppm) | CO (%) |
| 1 | 0.18 | 5.18 | 0.02 |
| 2 | 0.00 | 0.00 | 0.00 |
| 3 | 0.00 | 0.00 | 0.00 |
| 4 | 0.00 | 0.47 | 0.00 |
| 5 | (not read) | | |
| 6 | 0.00 | 8.28 | 0.00 |
| 7 | 0.00 | 4.42 | 0.00 |
| Sum of Cycles 1–7 | 0.18 | 18.35 | 0.02 |
| | 0.00 gm/mi | 0.05 gm/mi | 0.59 gm/mi |

EXAMPLE NO. 4

A 307 CID V8 engine was equipped with apparatus suitable for practice of the invention's process substantially alike that used in the preceding examples. Six PMR devices were assembled differing only in that three PMR devices employed baffles of RA 330 expanded metal with copper flash and three PMR devices employed baffles of RA 330 expanded metal without copper flash. In testing, one bank of the V8 engine was equipped with a PMR device having baffles coated with copper flash and the other bank with a PMR device without copper flash on the baffles. The 307 CID engine was installed on a test chassis and operated according to the FTP. The concentrations of HC, carbon monoxide and nitric oxide were measured according to the FTP by NDIR instrumentation. This test was repeated for each of the three pairs of PMR devices. Each pair of PMR devices thus tested was then removed from the 307 CID engine and placed on a 400 CID engine operated according to the invention's process on a specific fuel, to be described, for a period of 100 hours at steady state conditions of 2,500 rpm with 10 inches Hg. manifold vacuum. After the 100 hrs. of steady state operation according to the stated conditions each pair of PMR devices was removed from the 400 CID engine and again tested on the 307 CID engine on the chassis dynamometer as described previously. Emission values of HC, carbon monoxide, nitric oxide were again obtained and compared with those values obtained on the same PMR devices before the 100 hour testing on the specific fuel.

The described testing was completed on three pairs of PMR devices; each pair was tested for 100 hours on fuels containing different amounts of tetraethyl lead. This testing is summarized in the following table. Values shown are the average of two FTP tests on the same pairs of PMR devices.

TABLE 15

| | Treated Exhaust Effluent Content (gm/mile) | | | | | |
|---|---|---|---|---|---|---|
| | Baffles w/Copper Flash | | | Baffles w/o Copper Flash | | |
| Unleaded Fuel (a) | HC | NO | CO | HC | NO | CO |
| Before 100 Hour Test | 0.01 | 0.04 | 0.89 | 0.01 | 0.05 | 0.63 |
| After 100 Hour Test | 0.04 | 0.03 | 1.33 | 0.01 | 0.03 | 0.77 |
| Low-Leaded Fuel (b) | | | | | | |
| Before 100 Hour Test | 0.01 | 0.03 | 0.91 | 0.01 | 0.03 | 0.68 |
| After 100 Hour Test | 0.01 | 0.01 | 0.36 | 0.01 | 0.04 | 0.47 |
| High Leaded Fuel (c) | | | | | | |
| Before 100 Hour Test | — | — | — | — | — | — |
| After 100 Hour Test | 0.01 | 0.05 | 0.56 | 0.01 | 0.06 | 0.34 |

NOTES:
Average of two FTP tests on same PMR devices.
The unleaded fuel (a), low-leaded fuel (b), and high-leaded fuel (c) have properties as specified in Table 16.

TABLE 16

| | Indolene Clear (a) | Indolene 5 (b) | Indolene 30 (c) |
|---|---|---|---|
| Research Octane | 97.7 | 99.9 | 104.2 |
| Motor Octane | 87.8 | 90.5 | 95.3 |
| API Gravity | 58.7 | 58.3 | 58.7 |
| Specific Gravity | .744 | .7455 | .744 |
| Reid Vapor Pressure | 8.45 | 8.50 | 8.55 |
| Distillation IBP | 91 | 90 | 90 |
| 10% | 127 | 128 | 127 |
| 30% | 181 | 183 | 182 |
| 50% | 215 | 216 | 215 |
| 70% | 240 | 240 | 241 |
| 90% | 298 | 303 | 296 |
| End Point | 401 | 402 | 401 |
| % Recovered | 98 | 98 | 98 |
| % Residue | 1 | 1 | 1 |
| % Loss | 1 | 1 | 1 |
| Pb. (g per gal.) | 0.063 | 0.560 | 3.171 |
| Oxidation Stability (Min.) | 600+ | 600+ | 600+ |
| Sulfur (% by wt.) | 0.016 | 0.014 | 0.005 |
| 20% Distillation Slope | 2.70 | 2.80 | 2.75 |
| RVP - Slope | 5.75 | 5.70 | 5.80 |
| Acidity of Residue | Pass | Pass | Pass |
| Corrosion | 1A | 1A | 1A |

From the foregoing examples it is apparent that the invention's process is advantageously applicable to treating the exhaust effluent produced by incomplete combustion of gasoline in automotive engines. However, exhaust effluents for treatment by the invention's process may be derived from other hydrocarbon fuels and other combustion apparatuses. Incomplete combustion of hydrocarbon fuels, such as gasoline, kerosene, diesel oil, and the like, can provide exhaust effluents suitable for treatment. Likewise, combustion means, such as both vehicular and stationary internal combustion engines, jet engines, diesel engines, flame heaters, and like combustion means can provide the incomplete combustion of the hydrocarbon fuel. The only requirement as to the hydrocarbon fuel and means providing incomplete combustion thereof is that the resulting exhaust effluent therefrom contains carbon monoxide, and oxides of nitrogen and generally hydrocarbons. The carbon monoxide is present in the effluent in appreciable amounts such that upon limited oxidation of the effluent the temperature of the effluent is elevated to at least 1,550°F, without complete oxidation of the effluent's carbon monoxide content.

In the foregoing disclosure and in the claims which follow, and where analysis and data of the amounts of various components in the effluent composition are presented in percent, PPM, etc., the various percent and amount, PPM (parts per million), percent, etc., are in volume units, unless expressly stated otherwise. Also, in the foregoing disclosure and the claims which follow, the phrases oxides of nitrogen and nitrogen oxides are employed with the indication that these phrases encompass compounds of the formula $N_xO_y$ where $x$ and $y$ are integers. However, where a specific nitrogen compound is recited, the specific recitation is intended to designate the specific compound and its formula such as nitric oxide, NO.

While the method of the invention has been described with particularity and by specific illustrations thereof, it is to be understood that modifications, variations, and equivalents thereof will be obvious and apparent therefrom to those skilled in the art, and that all obvious modifications, variations, and equivalents as fall within the true scope of the invention are intended to be encompassed with the invention being limited only by the scope of the appended claims.

What is claimed is:

1. A process for minimizing emission of noxious substances from an effluent of an internal combustion engine coating containing carbon monoxide, hydrocarbons, and oxides of nitrogen, which process comprises the steps of, sequentially:
   a. Oxidizing only a portion of the total oxidizable components in the effluent to raise its temperature to at least 1,550°F. by introducing an oxygen-containing gas into said effluent, said oxidation being such that the remaining carbon monoxide content of the effluent is substantially in excess of the stoichometric amount of oxides of nitrogen therein;
   b. Exposing said effluent to an environment to chemically reduce a substantial part of the oxides of nitrogen; and
   c. Exposing said effluent to an oxygen-containing gas in a non-catalytic environment, to effect flame oxidation at a temperature of at least 1,550°F. to oxidize oxidizable components remaining in said effluent.

2. The process of claim 1 wherein the remaining carbon monoxide content is at least about ½ percent.

3. The process of claim 1 which in step (b) employs an environment of at least 1,700°F and a metal catalyst for the chemical reduction of nitric oxide by carbon monoxide.

4. The process of claim 3 including step (b) applied to an effluent having an oxygen content of less than 0.30 percent.

5. The process of claim 3 which in step (c) includes an introduction of air into the effluent in an amount providing at least the stoichiometric amount of oxygen for oxidation of remaining oxidizable components in the effluent.

6. The process of claim 5 in which the air introduced into the effluent in step (c) is of an amount providing between 1 and 1½ times said stoichiometric amount of oxidizable components in the effluent.

7. A method for decreasing the carbon monoxide, hydrocarbon, hydrogen and nitric oxide content of a gaseous exhuast effluent emitted from a vehicle's internal-combustion engine operating on a hydrocarbon fuel in a manner providing said effluent which contains hydrocarbons, more than 5 percent carbon monoxide, more than 2 percent hydrogen, and less than 450 ppm oxides of nitrogen, which method comprises the steps of, sequentially:
   a. Introducing into said effluent air in an effective amount to oxidize portions of the contents of hydrocarbons, carbon monoxide and hydrogen with said oxidation providing exothermic heat sufficient to raise the temperature of the effluent to at least 1,650°F without decreasing said carbon monoxide content below 1 percent and with less than 0.75 percent oxygen remaining in said effluent after the flame oxidation;
   b. Passing said effluent into contact with a catalyst for chemical reduction of oxides of nitrogen; and
   c. In a non-catalytic environment introducing into the effluent from step (b) air in an effective amount to effect flame oxidation at a temperature of at least 1,550°F to oxidize substantially all hydrocarbons, carbon monoxide, and hydrogen remaining in said effluent; whereby there is provided a treated effluent containing less than 0.1 percent carbon monoxide, less than 0.1 percent hydrogen, and less than 50 ppm of oxides of nitrogen.

8. The process of minimizing carbon monoxide, hydrocarbon, and oxides of nitrogen contents of a gaseous exhaust effluent from a vehicle's combustion engine operating on a hydrocarbon fuel, which process comprises the steps of, sequentially:
   a. Operating the combustion engine with an air-to-fuel ratio less than the stoichiometric ratio for complete combustion of the hydrocarbon fuel effective to provide a gaseous exhaust effluent with a content of more than 5 perent carbon monoxide;
   b. Introducing air into the effluent in an effective amount to flame oxidize a portion of the carbon monoxide and other oxidizable components therein, thereby providing exothermic heat to raise the temperature of the effluent to at least 1,550°F, said effluent having a carbon monoxide content of at least 2 percent and an oxygen content of less than 0.75 percent;
   c. Exposing said effluent to an environment to chemically reduce oxides of nitrogen to nitrogen; and
   d. In a non-catalytic environment introducing air into the effluent in an effective amount to flame oxidize substantially all the remaining oxidizable components in the effluent at a temperature of at least 1,550°F.

9. The process of claim 8 in which are employed:
   i. in step (a) the operating of the engine at idle with the air-to-fuel ratio effective to provide the gaseous effluent with a carbon monoxide content of between 8 and 10 percent;
   ii. in step (b) the introducing of air in the effective amount to flame oxidize a portion of the carbon monoxide and other oxidizable components providing exothermic heat to raise the temperature of the effluent to at least 1,700°F without lowering the carbon monoxide content of the effluent to less than 3 percent;

iii. in step (c) the exposing of said effluent to a catalyst for a time effective to chemically reduce at least about one half of the nitric oxide content of the effluent to nitrogen; and iv. in step (d) introducing air into the effluent in the amount providing at least the stoichiometric amount of oxygen for substantially complete oxidation of the remaining carbon monoxide and other oxidizable components in the effluent.

10. The process of claim 9 in which in step (c) the catalyst is provided by interior surfaces of the apparatus in which step (c) predominantly is carried forth.

11. The process of claim 10 in which in step (c) additional metal catalysts are provided by including copper-coated stainless alloys open mesh baffles within the apparatus in which step (c) predominantly is carried forth.

12. The process of claim 11 in which in step (c) a catalyst is utilized which is a member selected from the group consisting of supported and unsupported metals and metal oxides and alloys and mixtures thereof Groups IB and IV to VIII of the Periodic system.

13. The process of claim 1 in which in step (b) a catalyst is utilized which is a member selected from the group consisting of supported and unsupported metals and metal oxides and alloys and mixtures thereof of Groups IB and IV to VIII of the Periodic system.

* * * * *